Jan. 12, 1926. 1,569,321
J. A. GYGAR
APPARATUS FOR THE ENGAGEMENT AND DISENGAGEMENT OF MULTIPLE
DISK CLUTCHES OF MOTOR VEHICLES
Filed May 22, 1923 2 Sheets-Sheet 2
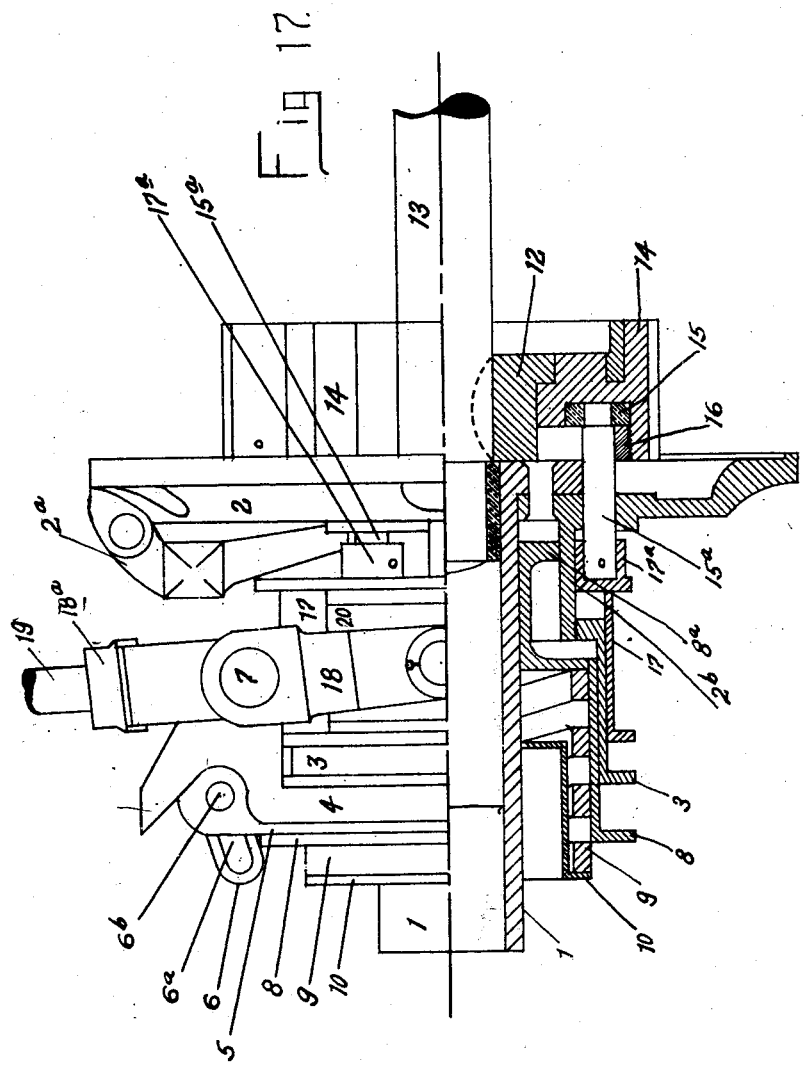
INVENTOR
Joseph Andrew Gygar
BY
Francis E. Boyce
ATTORNEY Patented Jan. 12, 1926.

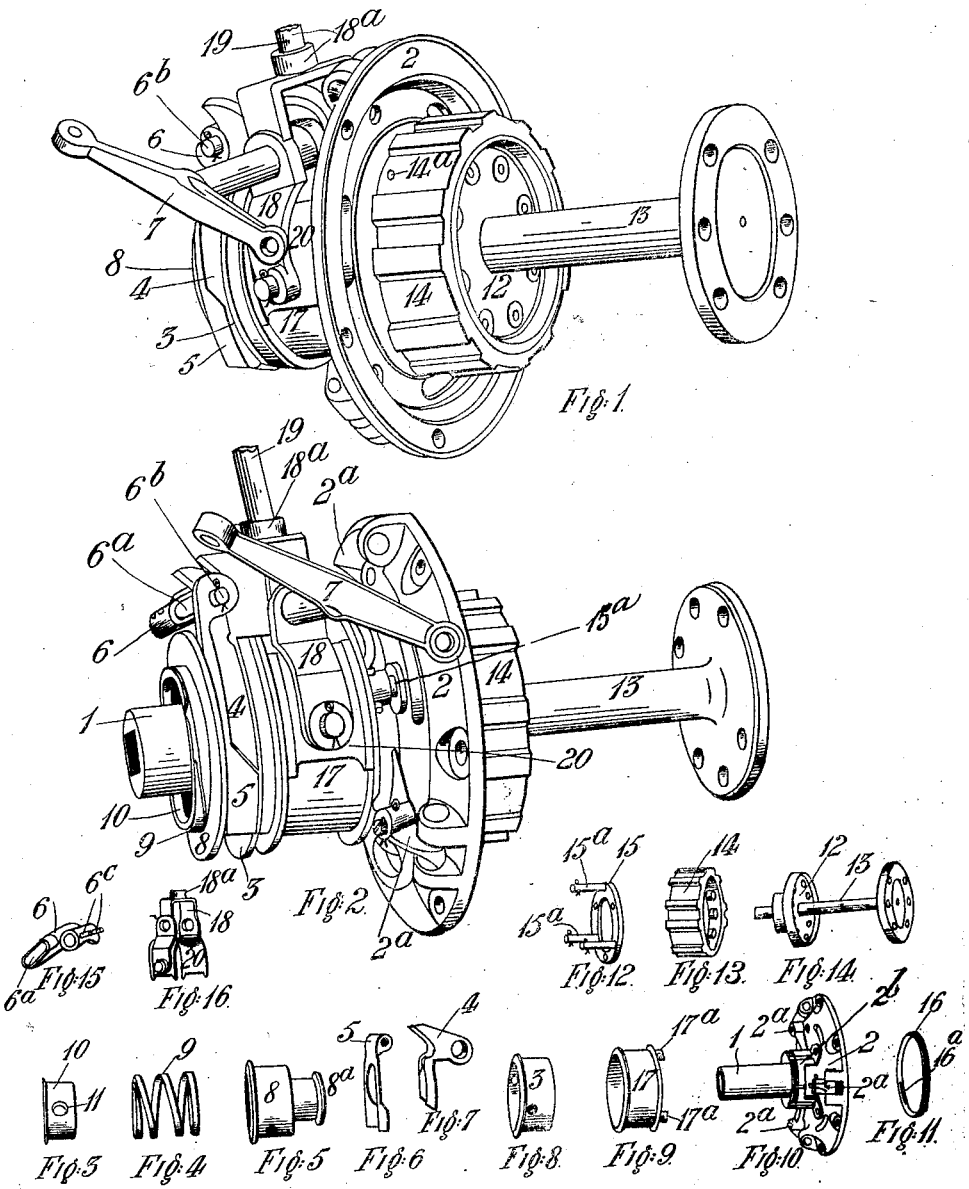

1,569,321

UNITED STATES PATENT OFFICE.

JOSEPH ANDREW GYGAR, OF BRISBANE, QUEENSLAND, AUSTRALIA.

APPARATUS FOR THE ENGAGEMENT AND DISENGAGEMENT OF MULTIPLE-DISK CLUTCHES OF MOTOR VEHICLES.

Application filed May 22, 1923. Serial No. 640,776.

*To all whom it may concern:*

Be it known that I, JOSEPH ANDREW GYGAR, a subject of the King of Great Britain and Ireland, residing at Brisbane, Upper Clifton Terrace, Red Hill, in the State of Queensland and Commonwealth of Australia, have invented certain new and useful Improvements in Apparatus for the Engagement and Disengagement of Multiple-Disk Clutches of Motor Vehicles; and I do hereby declare the following to be a full, clear, and exact description of the invention such as will enable others skilled in the art to which it appertains to make and use the same.

This invention relates to a device for the operation of the clutches on motor vehicles.

The object of the invention is to ensure easy starting of the engines of motor vehicles which are fitted with multiple disk clutches and to eliminate the end thrust to which the crank shaft and attendant mechanism is subjected when declutching takes place.

The drawings and specification show the application of the invention to the transmission block of the "Ford" type.

Referring to the accompanying drawings:—

Fig. 1, is a perspective view from one end of the device mounted partly on the driving plate shaft and partly on the transmission shaft.

Fig. 2, is a perspective view of the same from the opposite end.

Figs. 3 to 16 are details on a smaller scale of the various parts employed in the construction of the complete device, and Fig. 17 is a side elevation partly in section.

1 is the driving plate shaft into the outer end of which is fitted the universal joint of the propelling shaft of the vehicle, 2 the driving plate cast integrally with a chair $2^b$, said driving plate being bolted to the brake drum of the transmission block of the Ford type, 3 is the flanged abutment guide which is secured to the chair $2^b$ against which the wedge 4 abuts when the clutch spring is compressed and which also serves as a guide to support the grooved shift ring 17.

4 and 5 are the two halves of the wedge mechanism. 4 is hung on the lever shaft 7 so that the face opposite to the wedge side lies snugly against the flange of the abutment guide 3.

6 is a lifter arm which is fastened to and operated by the lever shaft 7. The slot $6^a$ in the lifter arm 6 allows the pin $6^b$ which is secured in the wedge 5 to move backwards and forwards when being operated.

$6^c$ are two pins for securing the lifter arm 6 to the lever shaft 7. 7 is a standard lever shaft.

8 is the multiple disk clutch shift ring. The smaller flange $8^a$ engages the three fingers $2^a$ on the driving plate 2 whilst the larger flange engages with the wedge 5 and the bore accommodates the spring 9.

10 is a spiral spring support, 11 a pin hole through which a pin is inserted to hold the spiral spring support in position.

12 is the female member of the positive clutch driving drum which is keyed to the transmission shaft 13, the said shaft 13 being bolted to the engine fly-wheel and crank shaft, and 14 is the male member of the positive clutch driving drum; 15 is a ring which fits into the male member 14 and is held in position by a ring nut 16; $15^a$ are three stems, riveted in the ring 15 and which pass through the driving plate 2 and fit into three bosses $17^a$ on the grooved shift ring 17. These stems $15^a$ are secured to the bosses $17^a$ by cotter pins.

16 is a threaded ring nut for holding the ring 15 in position in the driving drum and is prevented from shifting by three split pins which fit into the holes $14^a$ and $16^a$.

17 is a grooved shift ring for operating the positive clutch and which slides axially on the flanged guide 3.

18 is a fork piece for operating the grooved shift ring 17, and is tapped in the boss $18^a$ into which a suitable pedal stem 19 is fitted. This fork is hung on the lever shaft 7.

20 are two shoes hung in the fork piece 18 and engage against the flanges of the shift ring 17.

In using the invention, by depressing a pedal which is attached to the stem 19 and which is screwed into boss $18^a$ of the fork 18, on the bottom of which are two shoes 20 the grooved shift ring 17 is moved axially. Into each of the three bosses $17^a$ of the grooved shift ring 17 are fastened stems 15ª which pass through the driving plate 2 and which are secured at their other ends to the ring 15 which is held in position by ring nut 16 and allowed to turn freely in the male member 14 of the positive clutch.

Therefore when member 17 is moved axially male member 14 is moved axially also. The amount of travel is sufficient to disengage the dogs of the positive clutch 14 and 12 which are shown plainly in Fig. 1.

This now leaves the female member 12 free to rotate with the transmission shaft 13 which is permanently fixed to the engine crank shaft.

The multiple disks which are assembled on the periphery of the member 14 whether engaged or disengaged do not now interfere with the turning over of the engine, consequently the engine is easy to crank over by hand or by starter. This is the sole purpose of the positive clutch.

When the engine has been started up the car is set in motion on the slow gear and when car and engine are running at suitable speed on the slow gear (with the multiple disks engaged) the positive clutch is engaged.

The grooved shift ring 17 slides upon the flange guide 3 which is secured to the chair 2ᵇ and which is integral with the driving plate 2.

The flange of the guide serves as an abutment against which the back face of the wedge 4 abuts when the wedge 5 is lifted by the lifter arm 6. The lifter arm 6 is secured to the shaft 7 and is thereby operated, while the wedge 4 and the fork 18 are merely hung thereon.

To disengage the multiple disks which are assembled on the positive clutch member 14, the fingers 2ª on the driving plate 2 are released by the small flange 8ª of the disk clutch shift ring 8 being moved axially.

This is accomplished by operating the lever and shaft 7 to which the lifter arm 6 is secured; this causes arm 6 to lift, consequently the pin 6ᵇ lifts the wedge 5; the slot 6ª allows for the free movement of the pin 6ᵇ when the arm 6 is drawn upwards.

The wedge 5 when being lifted presses outwards from the wedge 4 and engages the larger flange of the disk shift ring 8 which causes the flange 8ª to release the fingers 2ª on the driving plate 2.

The wedge 5 when being lifted also presses inwards against the inclined planes on the wedge 4. The thrust which now occurs on the back of the wedge 4 is taken up by the abutment flange on the guide 3 which is screwed to the chair 2ᵇ, said chair being integral with the driving plate 2.

It is now obvious that as much pressure as is required to compress the spring 9 to release the multiple disks, an equal amount of pressure is also exerted against the driving plate through the agency of the chair 2ᵇ and the abutment guide 3.

A balance is now effected, consequently there is an absence of end thrust on the crank shaft and attendant mechanism.

What I claim as my invention and desire to secure by Letters Patent is:—

1. In improvements in apparatus for the engagement and disengagement of multiple disk clutches of motor vehicles, the combination of a driving shaft, a driving plate carried thereby, a chair cast integrally with said plate, an abutment flanged piece secured to said chair, a shift ring connected to the driving plate, a transmission shaft, a male clutch member and a female clutch member keyed to said transmission shaft, a metal ring fitting into the male member, a ring nut holding said metal ring in position, pins passed through the driving plate and fitted to the metal ring, a fork piece provided with a tapped boss, a stem for operating same, shoes hung on the fork piece and a clutch lever and shaft for controlling the rotation of the driving shaft.

2. In improvements in apparatus for the engagement and disengagement of multiple disk clutches of motor vehicles, the combination of a shaft, a driving plate carried thereby, a chair cast integrally with said plate, an abutment flanged piece secured to the chair, a unitary clutch lever and shaft, a pair of relatively slidable wedge pieces hung thereon, a lifter fastened to the clutch shaft and connected to one of said wedge pieces, a clutch shift ring adapted to engage the driving plate, and a spiral spring received in said ring.

In testimony whereof, I affix my signature.

JOSEPH ANDREW GYGAR.